UNITED STATES PATENT OFFICE.

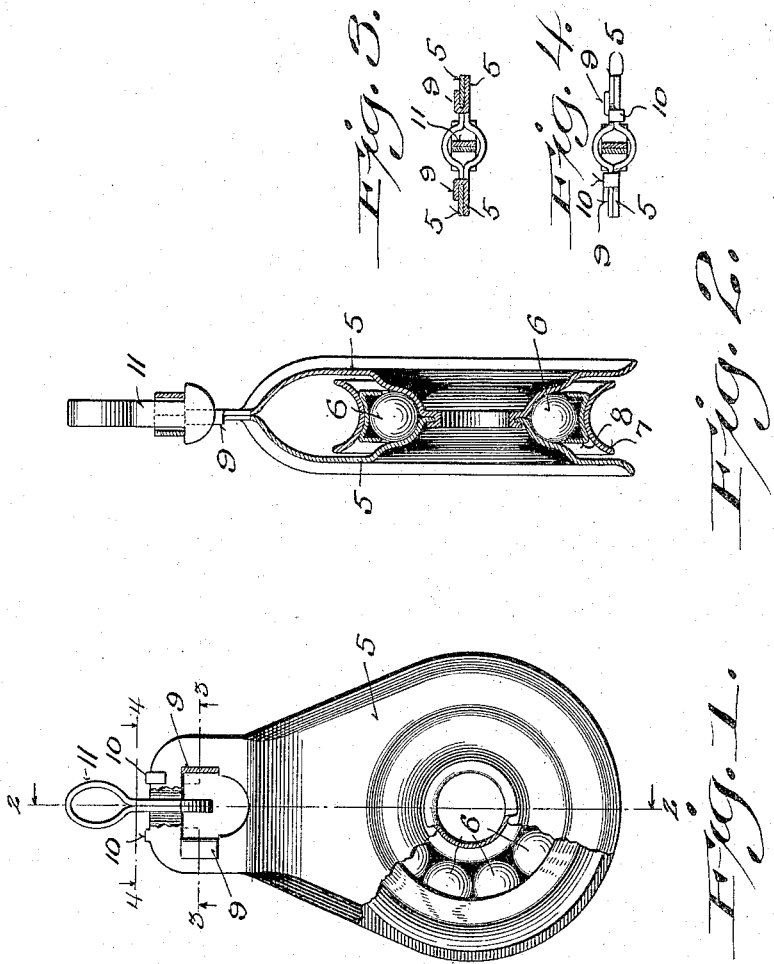

ANTHONY B. FERDINAND, OF MILWAUKEE, WISCONSIN.

PULLEY.

1,168,871. Specification of Letters Patent. Patented Jan. 18, 1916.

Application filed September 23, 1912. Serial No. 721,949.

*To all whom it may concern:*

Be it known that I, ANTHONY B. FERDINAND, a citizen of the United States, and resident of Milwaukee, in the county of Milwaukee and State of Wisconsin, have invented certain new and useful Improvements in Pulleys; and I do hereby declare that the following is a full, clear, and exact description thereof.

My invention relates to pulleys having sheet-metal shell sides, and it consists in what is herein particularly set forth with reference to the accompanying drawings and pointed out in the claims of this specification, its main object being to prevent chafing of cordage or the catching of chains reeved through the pulleys.

Further objects of the invention are to provide for economical union of the attaching ends of the shell sides of the pulleys, and the employment of swivels in connection with said pulleys.

Figure 1 of the drawings represents a side elevation of one of my improved pulleys partly broken away; Figs. 2 and 3 sectional views of the same respectively indicated by lines 2—2 and 3—3 in Fig. 1, and Fig. 4, a plan view of said pulley having a swivel thereof in horizontal section on line 4—4 in said Fig. 1.

Referring by numerals to the drawings, 5 indicates each of a pair of preferably sheet-steel parallel plates constituting the shell sides of my improved pulley, the same being swaged from suitable blanks into the desired form. Like in my Letters Patent No. 819,874 of May 8, 1906, the shell sides of the pulley are apertured and inwardly extended to form opposing cones having their meeting ends preferably seamed together, or they may be otherwise suitably connected, said cones serving as a race for bearing-balls 6 for the sheave of said pulley, and as herein shown said sheave comprises a concavo-convex band 7 having rigid fit on an annular channel-piece 8, with which said balls are engaged, this construction of the sheave being an economical novel feature of my improved pulley, in that by the use of the structure described, the channel band 8 is directly connected with the sheave and seats on the balls 6. By this arrangement a more compact and stable structure is produced with a reduction of the amount of material required, in that in the present invention the sheave is simply a concavo-convex band interlocking with the channel band 8, the channel band seating directly on the balls, whereas in my aforesaid prior patent the interlocked webbed portions of the pulley carry a channel that seats on the bearing.

The edges of the shell sides of the pulley are made flaring adjacent to the sheave to prevent chafing of cordage or the catching of a chain reeved through said pulley, this being another important feature of the improved device. It is also to be noted that the shell sides 5 extend in every direction beyond the periphery of the interposed sheave, and that the flanges resulting from the flaring of said shell sides serves as fenders that permit of the pulley being placed in contact with an opposing surface without detriment to the action of said sheave.

The attaching ends of the shell sides of the pulley are herein shown as being apertured and inwardly bent to face one another. It is also shown that some of the metal 9 of one of said shell-side ends may extend through the aperture of the other and be bent over on the same to thereby rigidly unite the two in an economical manner. This union is preferred in pulleys for some uses, but it may be omitted without departure from my invention as herein claimed. It is also shown that an ear 10 of each of the meeting ends of the shell sides of the pulley may be bent over against the other of said ends to prevent spreading apart of the two, particularly when the same are bowed, as is also herein shown, to form an eye for the shank of a swivel 11. This feature of my invention extends to any portion of the metal of either of said attaching ends embracing the adjacent edge of the other. The swivel is preferably a single suitably bent strip of metal having its meeting ends widened to form stop-shoulders opposing the bowed portions of the shell sides of the pulley forming the eye with which the shank of said swivel is engaged.

While I have shown the sheave in ball-bearing upon cones extensions of the shell sides of the pulley, it may be otherwise supported between said shell sides, and these sides may be separate plates or in one piece with a connecting strip (not shown) as may be most desirable, according to the demands of the trade, without departure from what is herein claimed.

I claim:

1. A pulley comprising a shell provided with an interior bearing race, a sheave having its inner surface convexed, an annular channel band having a concave surface and carried by and interlocking with the convex surface of the sheave, and bearings interposed between the race of the shell and the channel band.

2. A pulley comprising a shell having a flaring exterior and provided interiorly with a bearing race, suspending means for the shell, a sheave within the shell, a bearing channel band rigidly interlocked with the inner surface of the sheave, and bearings interposed between the channel band and the race.

In testimony that I claim the foregoing I have hereunto set my hand at Milwaukee in the county of Milwaukee and State of Wisconsin in the presence of two witnesses.

ANTHONY B. FERDINAND.

Witnesses:
N. E. OLIPHANT,
M. E. DOWNEY.

Copies of this patent may be obtained for five cents each, by addressing the "Commissioner of Patents, Washington, D. C."